Figure 1:
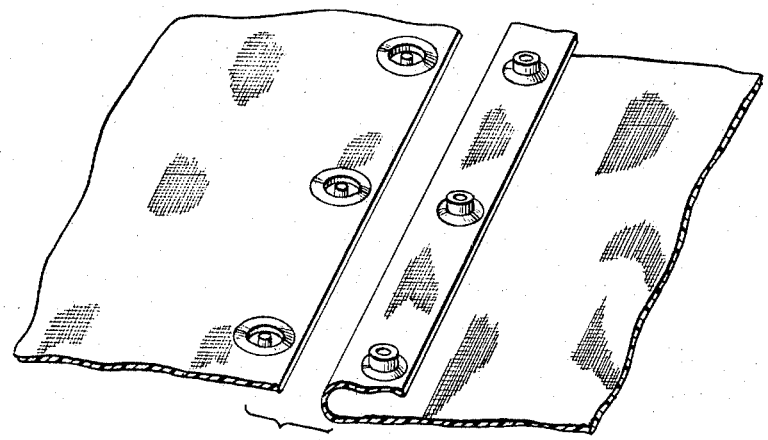

April 23, 1968     A. LABEK     3,378,893

DISCOID SNAP FASTENER

Filed Oct. 15, 1964

INVENTOR.
Alfred Labek

United States Patent Office 3,378,893
Patented Apr. 23, 1968

3,378,893
DISCOID SNAP FASTENER
Alfred Labek, Kienbergstrasse 16, Kufstein, Austria
Filed Oct. 15, 1964, Ser. No. 404,068
7 Claims. (Cl. 24—201)

The invention relates to a discoid fastening or connecting element which is made of plastics and which can be welded to plastics foil by fully automatic procedures.

In the plastics industry, it is often required to have fastening or closing or connecting devices or the like for interconnecting or fastening or closing plastics foils or articles made thereof. There are many ways of meeting this need, but all the known solutions of the problem are fairly complicated either as regards the physical construction of the fastening devices or as regards the machinery required to manufacture them; also, the durability of the fasteners or the like is often unsatisfactory. In the known fastening devices or the like, the discoid elements are connected to the foils by sewing or sticking and occasionally by welding, more particularly high-frequency welding. All these procedures make use of the natural resilience of various kinds of thermoplastics. The metallic press-stud fastenings known from textiles were imitated to give similar thermoplastics connectors and fasteners.

Various plastics press-stud devices are known but cannot be applied automatically in the present state of the art. The known elements consist of discoid parts which must be applied by hand or else must be supplied manually to appropriate attaching devices. This procedure is irrational and uneconomic and is therefore of very limited use; it is certainly useless for the mass production of cheap mass-produced articles such as plastics bags. The reason for this is that in all the known forms of press-stud-like fastenings not only must the complementary parts, for instance, the female part and the male part, be aligned correctly to one another but also they must be placed on the foil with right sideness to have the correct side placed on the plastics strip or articles manufactured therefrom, and it is this latter requirement of placing the elements with their right side on the strip that has so far proved impossible to perform fully automatically at reasonable cost.

It is an object of this invention to obviate this disadvantage by providing a fastening or closing element for plastics foil or for articles consisting of plastics foil each element comprising two discoid parts adapted to be welded by fully automatic procedures to surface portions of the plastics foil or foils to be interconnected.

It is a further object of this invention to provide a fastening or closing element of the kind described above the parts of which may be placed on the foil without regard to right sidedness.

To this end, according to the invention, each of the said portions of the element is symmetrical of the central plane thereof extending between its opposite surfaces. The invention therefore provides for the first time ever a discoid plastics connecting or fastening element having parts both sides of which are adapted to be welded to the foil and which thus does not have to be placed on the foil with right sideness as is the case with the known elements. Therefore the parts of the element according to the invention can be welded fully automatically to plastics foil to produce press-stud-like fasteners without a large outlay.

It is a further object of the invention to provide fastening or connecting elements as outlined above in various forms. In one such element one of the parts is a female part and the other is a male part. Another element has two identical parts each being provided with means for securing thereto other fastening or connecting members interconnecting the said parts. A third element according to the invention consists of two parts made of plastics-bound magnetisable barium ferrite and being held in engagement by magnetic forces. The latter parts can be of identical shape or can take the form of a female part and a male part, respectively.

A further object of the invention consists in providing a method for fully automatically applying and welding fastening or connecting elements according to the invention to plastics foil or foils or to articles consisting of plastics foil or foils.

Still a further object of the invention consists in providing an apparatus for performing the afore-mentioned method.

According to the invention the method for applying and welding the elements of the kind above described to an advancing plastic strip comprises the steps of feeding the fastening elements from a supply receptacle on to the plastic strip at a predetermined part thereof, whereafter the elements fed onto the plastics strip are welded thereto.

Other objects, features and advantages will appear from the drawings and the description hereinafter given in conjunction with the drawings, wherein:

FIGURE 1 is a perspective view showing two strips of plastics foil provided at the edges thereof with interconnecting elements according to the invention for connecting them along their edges, and FIGS. 2 to 5 are perspective views of different forms of connecting or fastening elements according to the invention.

In FIGURE 1 two plastic foils are shown which are provided at the edges thereof with connecting elements according to the invention consisting of two parts forming together a snap-type connection.

The latter fastening or connecting elements may be of the form shown in FIGS. 2 to 5.

Figure 2:
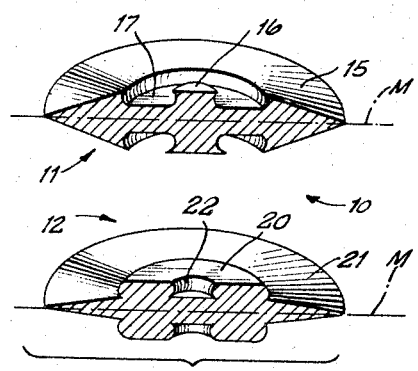

The connecting element 10 according to FIG. 2 consists of two parts 11, 12 each of which is provided with a peripheral flange 15 and 21, respectively, adapted to be welded to the foil. Each of the two parts 11, 12 is shaped symmetrically of the plane M extending between its opposite surfaces.

Each of the parts 11, 12 has at the opposite surfaces thereof a centrally arranged securement face formed with a protuberance 16 and 20, respectively, and with a recess 17 and 22, respectively, the protuberance and recess of part 11 mating with the recess and protuberance, respectively, of part 12.

Figure 3:
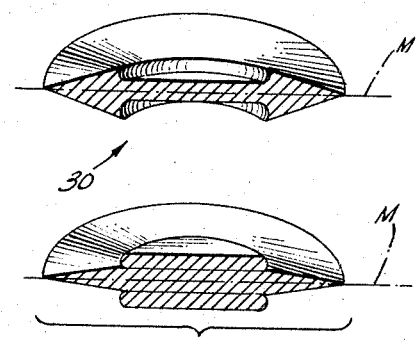
Figure 4:
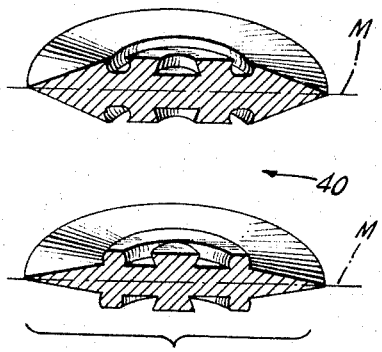
Figure 5:
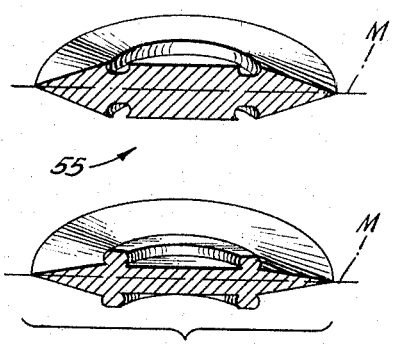

The elements 30, 40 and 55 shown in FIGS. 3 to 5 are similarly shaped as the element according to FIG. 2 with the exception of the special construction of their securement surfaces. The different constructions of the securement surfaces of the elements shown in FIGS. 2 to 5 may be clearly seen from the said figures and need not be further described. It should only be noted that each of the said elements has at least on one of its portions a protuberance cooperating with a recess in the other part thereof and forming therewith a snap-type connection.

It is not absolutely necessary that the fastening elements consist of male and female parts forming a snap-type connection as is the case with the afore-described elements. It is also possible to use identical parts for the fastening elements, if further fastening means, e.g. strips or strings are provided interconnecting the appropriately shaped identical parts, or if the identical parts are formed of plastics containing magnetic material, e.g. barium ferrite, so that they are able to be held in engagement by magnetic forces.

*Operation*

The aforedescribed fastening elements lend themselves to formation of a variety of materials in a variety of fashions, as will be apparent to those skilled in the art. It is preferred however that they be fabricated from thermoplastic materials, or the like, adapted for conventional heat welding such as utilized in the plastics fabricating arts.

In use, one of the parts of the fastening element is secured to the surface of the member or sheet with respect to which fastening is desired, and the other of the parts of the fastening element is secured to the surface of the other sheet or part which it is desired to conjoin with said first mentioned part. The advantages derived from the utilization of this invention permit the positioning of the fastening element parts on the surface of the member or sheet without regard to the right sidedness of the respective fastening element part. As a result, the fastening element parts may be fed from a simple feeding hopper without requiring the relatively expensive orientation facilities which would be required were the fastening element parts formed with a right and wrong side.

As best seen in FIG. 1, the fastening elements may conveniently be employed to join the edges of plastic sheet materials by securing the fastening element parts, as shown, along the edges to be conjoined. Thereafter conjunction of the fastening element parts is performed merely by pressing the securement face of one part against the securement face of another part to force the protuberances and studs into the recesses provided in the main face of the other part.

To apply and weld the mating parts of fastening elements to such edges of plastics sheets as it is desired to interconnect, the edges to be interconnected are advanced one beside another and parallel with one another, and the complementary parts of the fastening elements are simultaneously positioned in pairs on, and welded to, the respective edges of the sheets. To provide complementary fastening element parts on both edges of a plastics sheet which it is desired to conjoin with other similar plastics sheets along the one and/or the other edge thereof, the advancing plastics sheet is folded along its length and eccentrically with respect to its longitudinal center, whereafter the elements are placed on and welded to the edges which thus have been brought adjacent one another.

This latter process provides also a very simple way of producing plastics bags closable by means of complementary fastening element parts if, in accordance with the invention, after the complementary fastener element parts have been welded to the plastics sheet, a transverse separating weld is effected at spaced intervals across the width of the sheet when the sheet has advanced by one bag width. Without this separation by welding, the process just described leads to continuous plastics strips which, placed one beside another to make up large areas, can rapidly be interconnected, then separated as required. Plastics strips or sheets of this kind are in great demand, for instance, by the building industry to cover scaffolding.

In the process according to the invention, the connecting or fastening parts or the like are withdrawn from a supply receptacle in a continuous flow, are automatically and individually separated from the continuous flow, and are then placed on the plastics strip at a predetermined part thereof, whereafter the parts on the plastics strip are welded fully automatically thereto, the timing and placing being adapted to the individual delivery from the flow.

The apparatus according to the invention for performing the above process according to the invention is distinguished by: a supply receptacle for the parts of the connecting or fastening elements or the like, the receptacle being formed with a delivery aperture through which such parts are discharged in a continuous flow; a continuous conveyor disposed below said aperture; a device which is disposed at the end of the conveyor, is continuously supplied thereby with said parts and which is adapted to deliver the same individually and at predetermined time intervals to the continuously or intermittently advancing plastics strip; and a welding device which is timed to operate in co-operation with the individual delivery device and which welds the parts disposed on the plastics strip thereto. The continuous conveyor belt, a conveyor bar, a vibrating conveyor or a combination of such devices. Very conveniently, the device for individually delivering the said parts to the plastics strip can be a plate feeder; plate feeders of this kind are known per se and are used, for instance, in the pharmaceutical industry to separate individual tablets from a continuous moving flow.

According to another important feature of the apparatus according to the invention, the welding electrodes of the welding device have welding surfaces shaped to match those boundary surfaces or welding flanges of the parts of the said elements which it is required to weld. This feature means that the parts of the connecting or fastening elements which are disposed on the plastics strip and which, in accordance with the invention, have the same shape on both sides are firmly retained during welding; the welded connection is therefore reliable and durable, even with very thin plastics foils, and is, moreover, at the right place, a very important consideration since the fastening elements according to the invention comprise complementary discoid parts which must be appropriately arranged on the foil or the particles made therefrom.

It is to be understood that the invention is not limited to any form or manner of practicing same, except insofar as such limitations are specified in the appended claims.

What is claimed is:

1. A fastener for connecting plastic foil comprising two discoid parts for attachment to a surface of said plastic foil, securement means on a surface of at least one of said discoid parts in the form of a concentric rib extending into gripping engagement with the other part for connecting said one part to the other discoid part, each of said parts being symmetrical about the longitudinal center plane thereof.

2. The fastener of claim 1, wherein said parts are shaped as male and female parts, said parts together forming a press-stud-type connection.

3. The fastener of claim 1, wherein said two parts are identical in peripheral shape.

4. The fastener of claim 3, wherein said parts include plastic-bound magnetisable barium ferrite.

5. The fastener of claim 2, wherein the surfaces of each of said two parts includes a centrally located securement face surrounded by a peripheral welding flange.

6. The fastener of claim 5, wherein each securement face of said other part is formed with a stud protuberance and recess, and each securement face of said one part is formed with a recess and said rib mating with the recess and protuberance on said other part.

7. The fastener of claim 6, wherein the protuberance on said other part is a centrally positioned stud surrounded by an annular recess, the rib on said one part being annular and surrounding a central recess.

References Cited

UNITED STATES PATENTS

| | | | |
|---|---|---|---|
| 1,208,612 | 12/1916 | Miller. | |
| 1,242,579 | 10/1917 | Moss | 24—213 |
| 2,745,159 | 5/1956 | Jones | 24—213 |
| 2,838,820 | 6/1958 | Hakanson | 24—216 |
| 3,176,364 | 4/1965 | Dritz | 24—213 |

FOREIGN PATENTS

| | | |
|---|---|---|
| 32,141 | 3/1908 | Austria. |
| 552,740 | 12/1956 | Italy. |

BERNARD A. GELAK, *Primary Examiner.*